Figure 1:
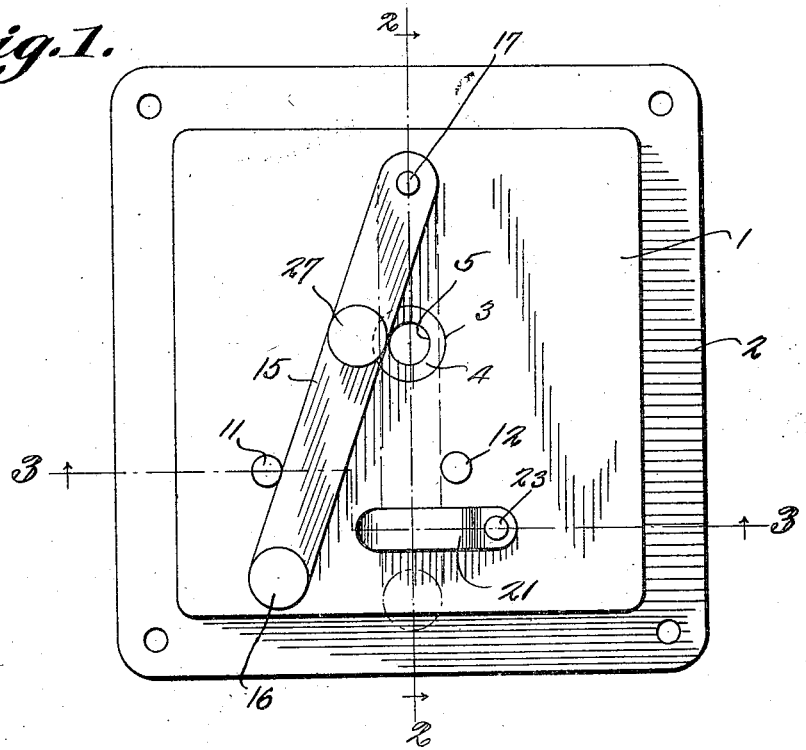

Sept. 28, 1926.

F. M. STARBUCK

AIR BRAKE

Filed Nov. 2, 1925

1,601,003

F. M. Starbuck, Inventor

Patented Sept. 28, 1926.

1,601,003

UNITED STATES PATENT OFFICE.

FIELDING M. STARBUCK, OF SUMMERSVILLE, WEST VIRGINIA.

AIR BRAKE.

Application filed November 2, 1925. Serial No. 66,277.

This invention aims to provide a novel means whereby, when the ignition switch of an automobile or other vehicle is opened, to stop the operation of the motor, a supply of air will be admitted into the cylinders of the motor, to brake the engine.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 2:
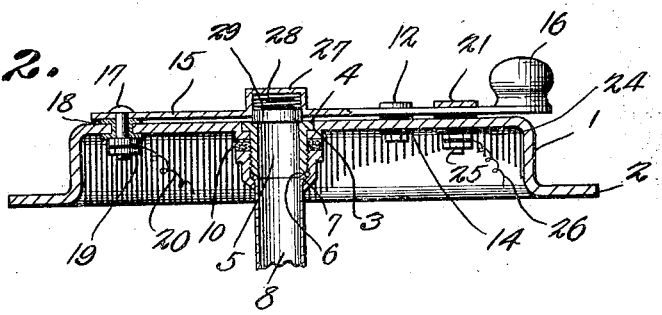
Figure 3:
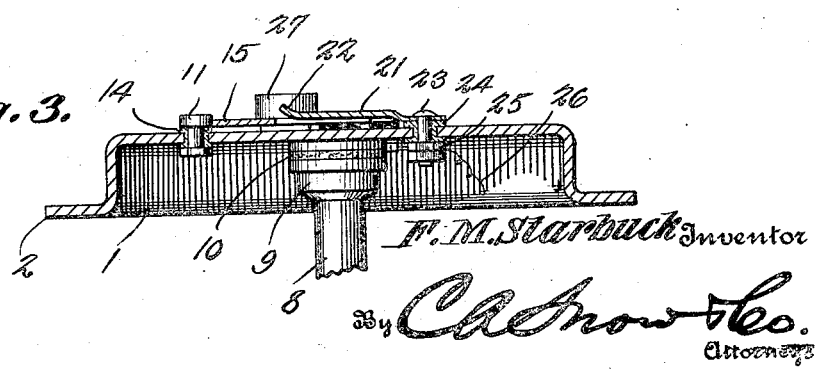

Figure 1 shows in elevation, a device constructed in accordance with the invention; Figure 2 is a section on the line 2—2 of Figure 1; Figure 3 is a section on the line 3—3 of Figure 1.

In carrying out the invention, there is provided a base 1 which may be of hollow box-like form, the base being provided, if desired, with an attaching flange 2. The numeral 8 indicates a pipe whereby air may be admitted to the manifold of an internal combustion engine, or to any other part of the engine through which the air may find its way into the cylinders of the engine. Any suitable means may be supplied for connecting the pipe 8 to the base 1. As shown, but not of necessity, the base 1 has a depressed seat 3 receiving the flange 4 of a nipple 5 having a beveled end 6, the end 6 of the nipple 5 cooperating with an outstanding flange 7 on the pipe 8, the flange 7 being engaged by a sleeve 9 which is threaded on the nipple 5, a compressible packing washer 10 being disposed about the nipple 5, and between the sleeve 9 and the seat 3, the construction being such that the flange 7 of the pipe 8 may be drawn up snugly against the end of the nipple 5, and, at the same time, the flange 4 of the nipple 5 may be drawn down snugly into the seat 3. The outer surface of the flange 4 of the nipple 5 is flush with the outer surface of the base 1.

Stops 11 and 12 are mounted in insulating bushings 14, carried by the base 1, the bushings 14 obviating any possibility of short-circuiting. A lever 15 swings between the stops 11 and 12, in a plane parallel to the base 1. The lever 15 may be equipped with a projecting handle 16. The lever 15 is mounted on a fulcrum member 17 carried by an insulating bushing 18 in the base 1, there being nuts 19 on the fulcrum member 17, the nuts cooperating with the bushing 18 to hold the fulcrum member 17 in place, and to retain a conductor 20. To close the circuit, by way of the lever 15, there is provided a spring tongue 21 having an inclined end 22 which enables the lever 15 to pass readily beneath the tongue, when the lever 15 is swung to the right, into the dash line position of Figure 1. The tongue 21 is mounted on a small bolt 23, or other securing element, carried by an insulating bushing 24 in the base 1, the bolt 23 being supplied with nuts 25 which retain the bolt in place, and, also, retain a conductor 26.

The lever 15 is supplied with any suitable means for closing the pipe 8. If desired, the lever 15 may be equipped intermediate its ends with a seat 27 housing a compression spring 28 bearing on a plunger 29 slidable in the part 27 and adapted to slide over the outer surface of the base 1, the spring 28 serving to press down the plunger 29 firmly on the base 1, so as to close the passage through the pipe 8 when the lever 15 is engaged with the tongue or switch member 21.

When the lever 15 is engaged with the switch tongue 21, the ignition circuit is closed through the conductor 26, the bolt 23, the tongue 21, the lever 15, the fulcrum member 17, and the conductor 20. At the same time, the plunger 29, or its equivalent, cooperating with the flange 4 of the nipple 5, closes the passage through the pipe 8, and air cannot flow through the pipe. The stop 12, cooperating with the lever 15, holds the lever in the position above described. When the lever 15 is swung over against the stop 11, out of contact with the switch tongue 21, the ignition circuit is opened, and, at the same time, the part 29 is moved off the flange 4 of the nipple 5, thereby opening a passage through the pipe 8, and permitting air to enter the cylinders of the engine, to brake the engine in a manner well understood by those skilled in the art.

What is claimed is:—

1. In a device of the class described, a base, a pipe connected to the base, a switch member on the base, a lever mounted to swing on the base, means for bringing the switch member and the lever into an electrical circuit, and means carried by the lever for closing the pipe when the lever is engaged with the switch member.

2. In a device of the class described, a base, a pipe connected to the base, and an electrical switch on the base, the switch including a movable member, and the movable member being provided with means for closing the pipe, when the switch is closed electrically.

In testimony that I claim the foregoing as my own, I have hereto affixed my signature.

FIELDING M. STARBUCK.